(12) United States Patent
McMiles et al.

(10) Patent No.: US 11,326,716 B2
(45) Date of Patent: May 10, 2022

(54) SOFT SHIFT SPM VALVE

(71) Applicant: THE SUBSEA COMPANY, Houston, TX (US)

(72) Inventors: Barry J McMiles, Houston, TX (US); Thomas A Cates, Houston, TX (US)

(73) Assignee: The Subsea Company, Houston, TX (US)

( * ) Notice: Subject to any disclaimer, the term of this patent is extended or adjusted under 35 U.S.C. 154(b) by 1582 days.

(21) Appl. No.: 14/344,662

(22) PCT Filed: Jun. 21, 2013

(86) PCT No.: PCT/US2013/046982
§ 371 (c)(1),
(2) Date: Mar. 13, 2014

(87) PCT Pub. No.: WO2013/192494
PCT Pub. Date: Dec. 27, 2013

(65) Prior Publication Data
US 2021/0310583 A1 Oct. 7, 2021

Related U.S. Application Data

(60) Provisional application No. 61/663,149, filed on Jun. 22, 2012.

(51) Int. Cl.
| | |
|---|---|
| *F16K 11/07* | (2006.01) |
| *F16K 47/02* | (2006.01) |
| *E21B 34/02* | (2006.01) |
| *E21B 33/035* | (2006.01) |
| *E21B 34/04* | (2006.01) |

(Continued)

(52) U.S. Cl.
CPC ........ *F16K 47/023* (2013.01); *E21B 33/0355* (2013.01); *E21B 34/025* (2020.05); *E21B 34/04* (2013.01); *E21B 34/10* (2013.01); *E21B 43/12* (2013.01); *F16K 11/0716* (2013.01); *Y10T 137/7855* (2015.04); *Y10T 137/7856* (2015.04)

(58) Field of Classification Search
CPC .......... E21B 43/12; E21B 34/10; E21B 34/04; E21B 34/025; E21B 33/0355; F16K 11/0716; F16K 47/023; Y10T 137/7855; Y10T 137/7856
See application file for complete search history.

(56) References Cited

U.S. PATENT DOCUMENTS 8,905,141 B2 * 12/2014 Gustafson ............... E21B 34/04
166/363

* cited by examiner

*Primary Examiner* — Umashankar Venkatesan
(74) *Attorney, Agent, or Firm* — James D. Petruzzi; The Petruzzi Law Firm

(57) ABSTRACT

A subplate mounted valve is disclosed having an open position and a closed position. The valve includes at least one pilot pressure intake port, a plurality of functional fluid ports, a spool movable between the open position and the closed position, and spring biasing the spool to either the open position or the closed position. To reduce water hammer due to quickly opening or quickly closing the valve, a flow regulation assembly is positioned at the pilot pressure intake port and has a chamber with a larger inlet channel at the intake position and transitioning to a smaller channel at the outlet position such that fluid flow at the intake port is reduced, thereby slowing the transition between the open position and the closed position and the transition between the closed position and the open position.

16 Claims, 3 Drawing Sheets

(51) Int. Cl.
  *E21B 34/10* (2006.01)
  *E21B 43/12* (2006.01)

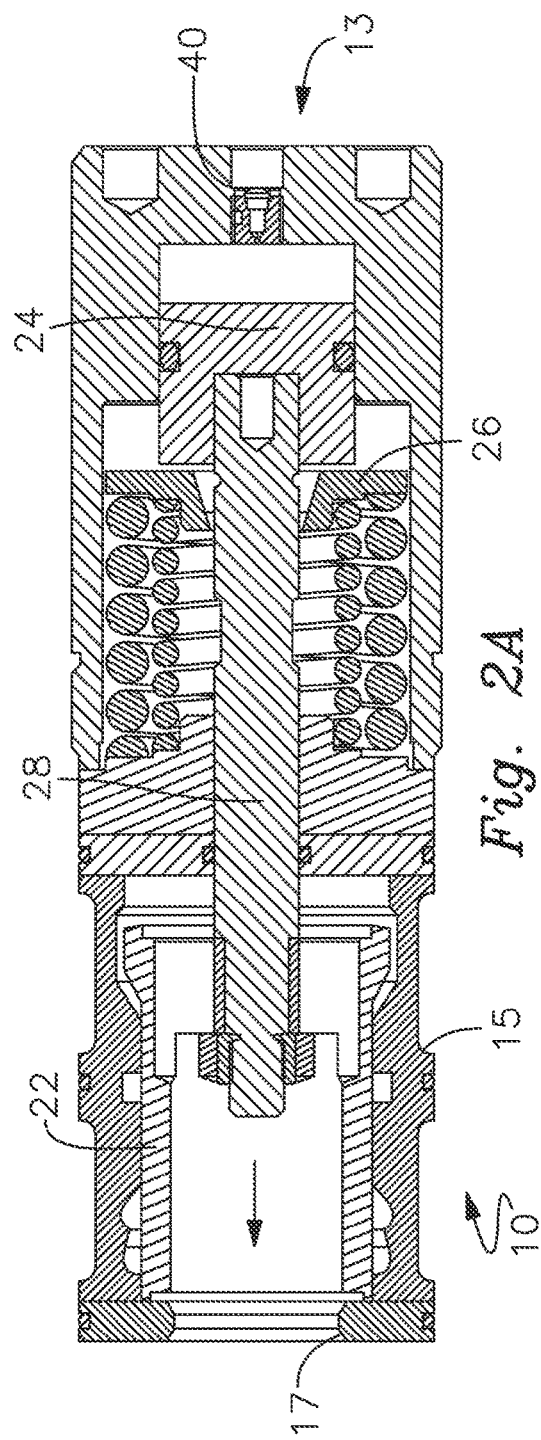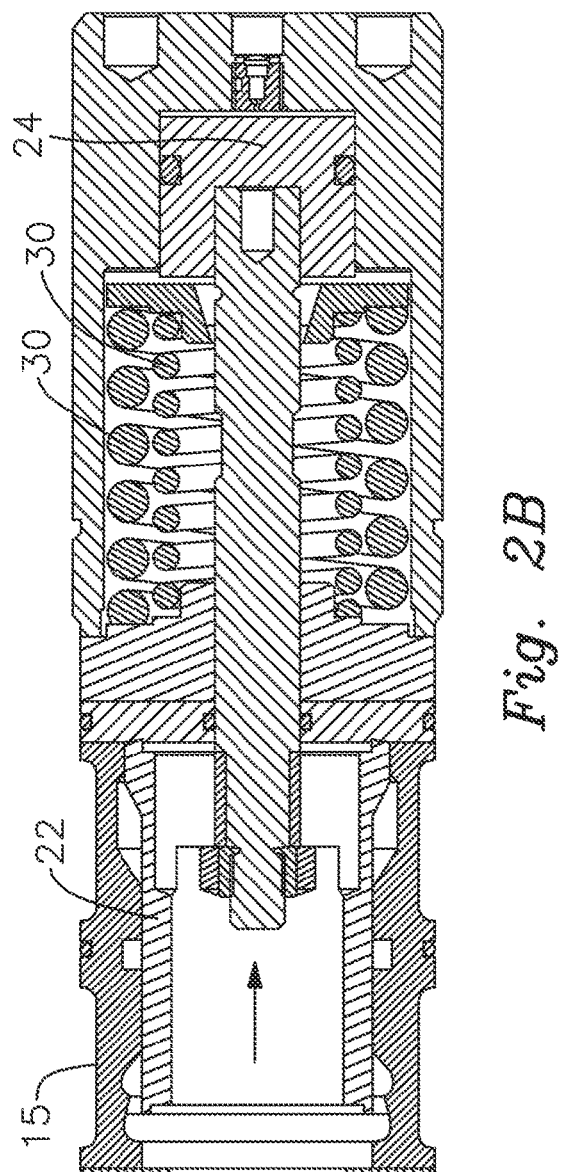

SOFT SHIFT SPM VALVE

CROSS REFERENCE TO RELATED APPLICATIONS

This application is based on provisional patent application No. 61/663,149 entitled "Soft Shift SPM Valve" filed on Jun. 22, 2012, which is hereby incorporated by reference as if fully set forth herein.

BACKGROUND OF THE INVENTION

The present invention relates to subplate mounted valves and more particularly to a subplate mounted pilot valve having a soft shifting feature for use in subsea applications and other desired locations.

Numerous devices presently exist for controlling the flow of functional fluid in connection with subsea operations. Su plate Mounted (SPM) valves are used to control fluid flow in high pressure systems. SPM valves open and close in a very short time interval, stopping or changing direction of functional fluid flow very abruptly. Closing or opening the valve in such a short time interval and in such high pressure environments often causes water hammer or hydraulic shock, a pressure surge or wave. This pressure wave can cause significant damage, from circuit failure and vibration to hose collapse. In addition, SPM valves are often used in pairs, one transitioning from the open to the closed position, while the other transitions from the closed to the open position. Because these valves do not open and close at a constant rate, additional problems can occur in the lines. Thus there exists a need for an improved SPM valve.

BRIEF SUMMARY OF THE INVENTION

The primary advantage of the invention is to provide an improved SPM valve that can reduce down time and damage of subsea lines, including function fluid lines.

Another advantage of the invention Is to provide an improved SPM valve that can reduce water hammer when closing or opening the valve.

Another advantage of the invention is to provide an SPM valve that has controlled opening and closing operations.

Another advantage of the invention is to provide an improved SPM valve that can have a reliable opening time period commensurate with a reliable closing time period.

In accordance with a preferred embodiment of the invention, there is shown a subplate mounted valve having an open position and a closed position, the subplate mounted valve comprises at least one pilot pressure intake port, a plurality of functional fluid ports, a spool movable between the open position and the closed position, and at least one spring biasing the spool to either the open position or the closed position; and a flow regulation assembly at the pilot pressure intake port having a chamber with, a larger inlet channel at the intake position and transitioning to a smaller channel at the outlet position such that fluid flow at the intake port is reduced thereby slowing the transition between the open position and the closed position and the transition between the closed position and the open position.

In accordance with another preferred embodiment of the invention, there is shown a subplate mounted valve having an open position and a closed position, the subplate mounted valve comprises at least one pilot pressure intake port; at least two functional fluid ports; a spool movable between the open position and the closed position; two nested springs biasing the spool to either the open position or the closed position; and a flow regulation assembly at the pilot pressure intake port having a chamber with a larger inlet channel at the intake position and transitioning to a smaller channel at the outlet position such that fluid flow at the intake port is reduced thereby slowing the transition between the open position and the closed position and the transition between the closed position and the open position.

In accordance with another preferred embodiment of the invention, there is shown a subplate mounted valve having an open position and a closed position, the subplate mounted valve comprises at least one pilot pressure intake port, a plurality of functional fluid ports, a spool movable between the open position and the closed position, and at least one spring biasing the spool to either the open position or the closed position; and a flow regulation assembly at the pilot pressure intake port having a chamber with a larger inlet channel at the intake position and transitioning to a smaller channel at the outlet position such that fluid flow at the intake port is reduced thereby slowing the transition between the open position and the closed position and the transition between the closed position and the open position, the regulation assembly comprising a poppet spring-biased towards the spool, a casing at least partially encompassing the spring, and a plug block restricting movement of the flow regulation assembly within the intake port.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include an exemplary embodiment to the invention, which may be embodied in various forms. It is to be understood that in some instances various aspects of the invention may be shown exaggerated or enlarged to facilitate an understanding of the invention.

FIGS. 2A and 2B show cross sectional views of a soft shift SPM valve in open and closed positions according to a preferred embodiment of the invention.

DETAILED DESCRIPTION OF THE PREFERRED EMBODIMENTS

Figure 1:
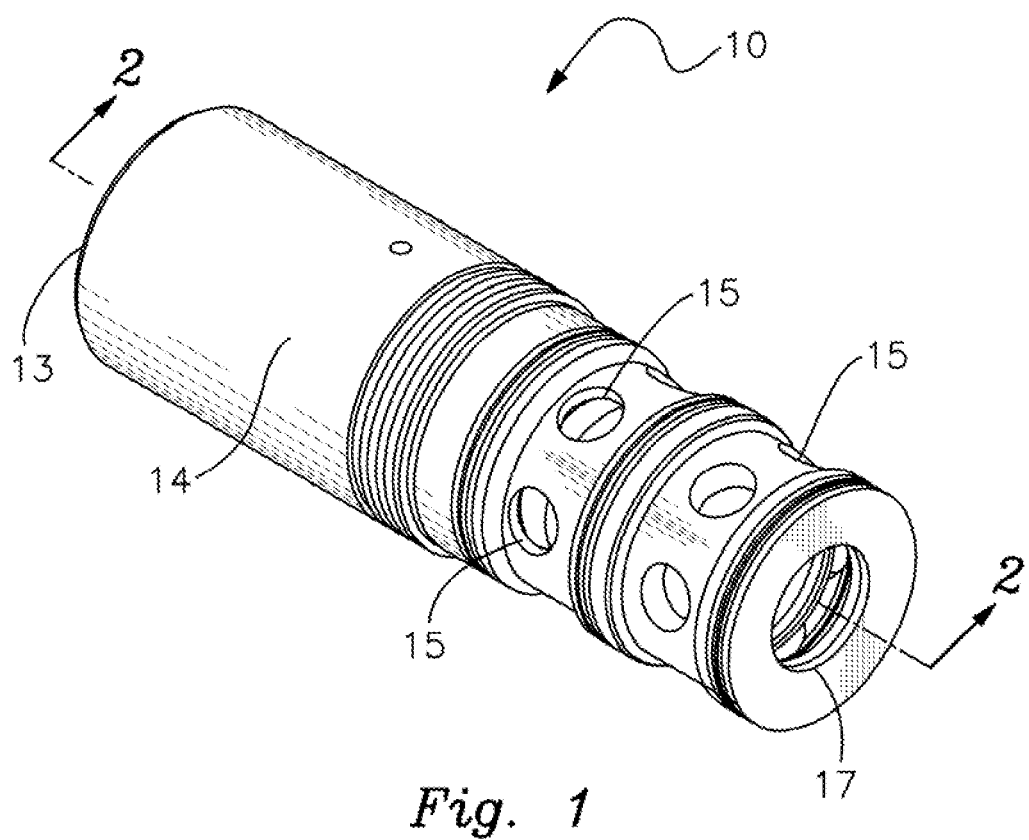
FIG. 1, shows perspective view of a soft shift SPM valve according to a preferred embodiment of the invention.

Referring now to FIG. 1, a perspective view of an SPM valve of the present invention is shown. SPM pilot valve 10 is shown having pilot pressure intake 13 at one end of case 14. Increased pressure at pressure intake 13 will cause SPM to transition from the closed position to the open position. SPM pilot valve 10 is configured in the normally closed position though it will be appreciated by those in the art that an SPM valve of the present invention can likewise be configured in the normally open position.

When in the closed position, fluid flows in to SPM valve 10 by way of port 17 at the generally opposite end of case 14 and flows out of SPM valve 10 by way of circumferential ports 15. When in the open position, supply pressure for functional fluid flows in to SPM 10 by way of circumferential ports 15 and functional venting fluid flows out of SPM 10 by way of port 17. In the embodiment illustrated, SPM valve 10 transitions from the fully closed position to the fully open position as pressure at intake 13 transitions 3000 p.s.i. The overall dimensions of SPM 10 as illustrated are approximately 12 inches in length and approximately 3⅝ inches in diameter.

FIG. 2A shows a cross sectional view of SPM valve 10 along line 2-2 of FIG. 1 in the open position, while FIG. 2B shows a cross sectional view of SPM valve 10 along line 2-2 of FIG. 1 in the closed position. In normal operation, an unrestricted pilot signal is sent to SPM valve 10, which shifts spool 22 rapidly. As the pressure at intake 13 increases to approximately 3000 p.s.i., piston 24 is moved in the direction of the arrow shown in FIG. 2A, causing platform 26 to move, thereby moving mandrel 28 and spool 22, also in the direction of the arrow shown in FIG. 2A. In the illustrated embodiment, spool 22, piston 24, platform 26 and mandible 28 move approximately 0.375 inches and is dependent on the size of valve. As the pilot pressure at intake 13 is reduced, biasing springs 30, return spool 22, piston 24, platform 26, and mandrel 28 in the direction of the arrow shown in FIG. 2B, thereby returning SPM 10 to the closed position.

Biasing springs 30 are of typical design and nested one within the other, often with wire rotation opposite one to the other, and the thinner gauge spring inside the thicker gauge spring, though any suitable configuration may be employed, depending upon the environment intended for use, such as for use with pilot pressures of differing amounts than as described in the illustrated embodiment.

The design of both spool 22 and case 14 in the present invention has been designed so there are tight tolerances between them to restrict the functional fluid flow until spool 22 is in the right position to start either opening or closing.

As pilot pressure changes rapidly, SPM valve 10 opens and closes at a very rapid rate, thereby causing sudden changes in pressure through the system, potentially causing damage. In addition, SMP valve 10 is often used in conjunction with another SPM valve 10, such that one is closing while another in opening, and the timing of the opening and closing between the two would benefit from coordinated movement so that one does not close appreciably before the other opens and one does not open appreciably before the other closes. Check assembly 40 is shown at intake 13 and will be described in further detail below in connection with FIG. 3, which is a larger illustration of check assembly 40 of FIG. 2.

Figure 3:
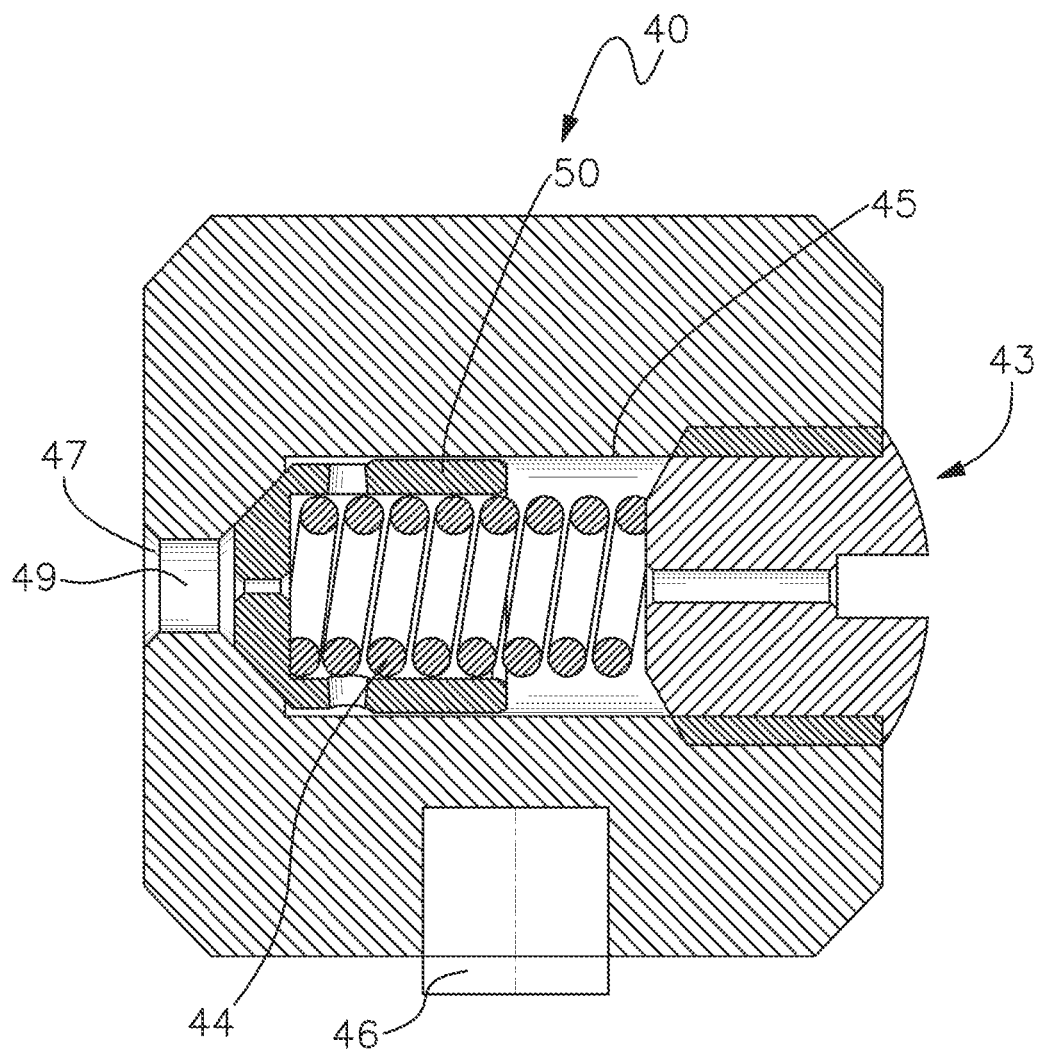
FIG. 3 shows a cross sectional view of a check assembly within a soft shift SPM valve according to a preferred embodiment of the invention.

Referring now to FIG. 3, there is shown check assembly 40 of the present invention. The dual restriction check valve is sized to slow down the speed of the movement of spool 22 so that there is a smooth transition from the open to close positions, as well as from the closed to open positions, thus eliminating the water hammer potential. Pilot pressure intake 13 allows fluid intake through inlet 43, through chamber 45, to outlet 47. Because outlet 47 is smaller that inlet 43, fluid flow rate is reduced between intake 13 and piston 24, thereby slow ring the piston movement and eliminating water hammer. When transitioning from a closed position as in FIG. 2B to an open position as in FIG. 2A, spring 44 biases poppet 49 toward piston 24 to properly direct pilot pressure. When transitioning from an open position as in FIG. 2A to a closed position as in FIG. 2B, poppet 49 exerts pressure against spring 44 allowing poppet 49 to move, allowing fluid flow rate to transition accordingly.

In the illustrated embodiment, attached to poppet 49 is guide casing 50 to restrict movement of spring 44 and poppet 49 to primarily lateral movement. Also included in the embodiment shown is plug block 46, a threaded block to restrict lateral and rotational movement of check assembly 40.

All of the compositions and/or methods disclosed and claimed herein can be made and executed without undue experimentation in light of the present disclosure. While the compositions and methods of this invention have been described in terms of various embodiments, it will be apparent to those of skill in the art that other variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

It will be understood that particular embodiments described herein are shown by way of illustration and not as limitations of the invention. The principal features of this invention can be employed in various embodiments without departing from the scope of the invention. All of the compositions and/or methods disclosed and claimed herein can be made and executed without undue experimentation in light of the present disclosure. Those skilled in the art will recognize, or be able to ascertain using no more than routine experimentation, numerous equivalents to the specific procedures described herein. Such equivalents are considered to be within the scope of this invention and are covered by the claims.

The invention claimed is:

1. A subplate mounted valve having an open position and a closed position, said subplate mounted valve comprising:
   at least one pilot pressure intake port, a plurality of functional fluid ports, a spool movable between the open position and the closed position, and at least one spring biasing the spool to either the open position or the closed position;
   a flow regulation assembly at the pilot pressure intake port having a chamber with a larger inlet channel at the intake position and transitioning to a smaller channel at the outlet position such that fluid flow at the intake port is reduced thereby slowing the transition between the open position and the closed position and the transition between the closed position and the open position; and wherein the flow regulation assembly comprises a poppet biased towards the spool.

2. A subplate mounted valve as claimed in claim 1 wherein said poppet is biased by a spring.

3. A subplate mounted valve as claimed in claim 2 wherein the flow regulation assembly further comprises:
   a casing at least partially encompassing said spring.

4. A subplate mounted valve as claimed in claim 1 wherein the flow regulation assembly further comprises:
   a plug block restricting movement of the flow regulation assembly within the intake port.

5. A subplate mounted valve as claimed in claim 1 wherein at least one of said plurality of functional fluid ports is located circumferentially about said valve.

6. A subplate mounted valve as claimed in claim 1 wherein said at least one spring comprises two springs.

7. A subplate mounted valve as claimed in claim 6 wherein said two springs are positioned one inside the other and the springs have opposite windings from each other.

8. A subplate mounted valve having an open position and a closed position, said subplate mounted valve comprising:
   at least one pilot pressure intake port;
   at least two functional fluid ports;

a spool movable between the open position and the closed position;

two nested springs biasing the spool to either the open position or the closed position;

a flow regulation assembly at the pilot pressure intake port having a chamber with a larger inlet channel at the intake position and transitioning to a smaller channel at the outlet position such that fluid flow at the intake port is reduced thereby slowing the transition between the open position and the closed position and the transition between the closed position and the open position, and wherein the flow regulation assembly comprises a poppet biased towards the spool.

9. A subplate mounted valve as claimed in claim 8 wherein said poppet is biased by a spring.

10. A subplate mounted valve as claimed in claim 9 wherein the flow regulation assembly further comprises:

a casing at least partially encompassing said spring.

11. A subplate mounted valve as claimed in claim 8 wherein the flow regulation assembly further comprises:

a plug block restricting movement of the flow regulation assembly within the intake port.

12. A subplate mounted valve as claimed in claim 8 wherein at least one of said plurality of functional fluid ports is located circumferentially about said valve.

13. A subplate mounted valve having an open position and a closed position, said subplate mounted valve comprising:

at least one pilot pressure intake port, a plurality of functional fluid ports, a spool movable between the open position and the closed position; and a flow regulation assembly at the pilot pressure intake port having a chamber with a larger inlet channel at the intake position and transitioning to a smaller channel at the outlet position such that fluid flow at the intake port is reduced thereby slowing the transition between the open position and the closed position and the transition between the closed position and the open position, said regulation assembly comprising a poppet spring-biased towards the spool, a casing at least partially encompassing said spring, and a plug block restricting the flow regulation assembly movement within the intake port.

14. A subplate mounted valve as claimed in claim 13 wherein at least one of said plurality of functional fluid ports is located circumferentially about said valve.

15. A subplate mounted valve as claimed in claim 13 further comprising at least one spring biasing the valve to either the open or closed position.

16. A subplate mounted valve as claimed in claim 15 wherein said at least one spring includes two springs positioned one inside the other and the springs have opposite windings from each other.

* * * * *